No. 831,796. PATENTED SEPT. 25, 1906.
E. B. MILLER & P. C. SAYGER.
SASH CORD GUIDE.
APPLICATION FILED JAN. 9, 1906.
2 SHEETS—SHEET 1.
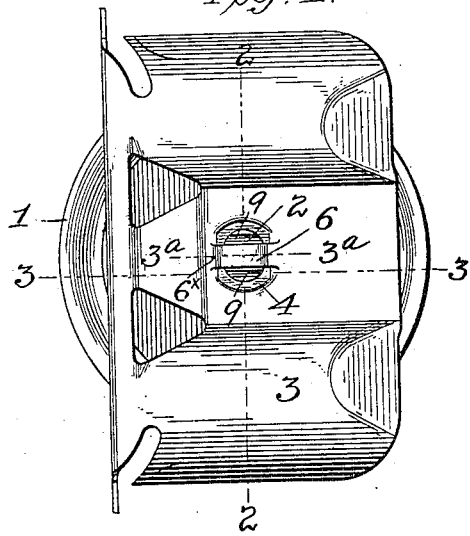
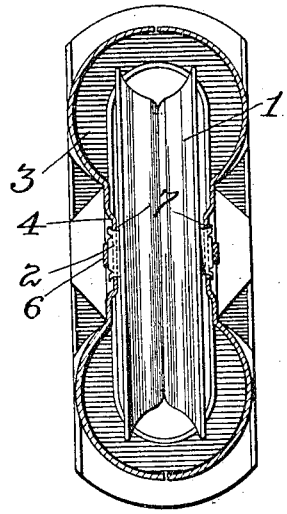
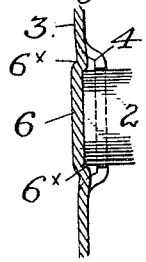
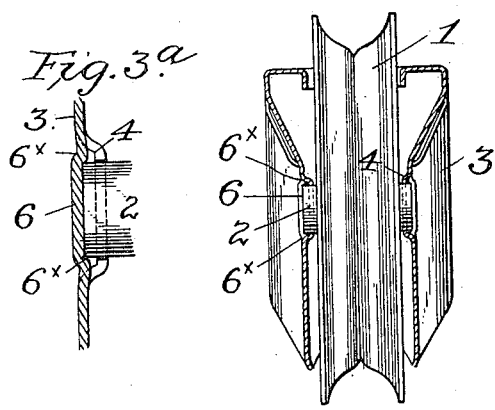
Witnesses
Edward N. Sarton
H. A. Farnham
Inventors
Elmer B. Miller
Peter C. Sayger
by Spear, Middleton, Donaldson & Spear
Attorneys No. 831,796. PATENTED SEPT. 25, 1906.
E. B. MILLER & P. C. SAYGER.
SASH CORD GUIDE.
APPLICATION FILED JAN. 9, 1906.

2 SHEETS—SHEET 2.

Attest:
A. Middleton
Edward N. Sarton

Inventors
ELMER B. MILLER.
PETER C. SAYGER
by Spear, Middleton, Donaldson & Spear
Att'ys.

UNITED STATES PATENT OFFICE.

ELMER B. MILLER AND PETER C. SAYGER, OF GRAND RAPIDS, MICHIGAN, ASSIGNORS TO GRAND RAPIDS HARDWARE COMPANY, OF GRAND RAPIDS, MICHIGAN.

SASH-CORD GUIDE.

No. 831,796.          Specification of Letters Patent.          Patented Sept. 25, 1906.

Application filed January 9, 1906. Serial No. 295,294.

*To all whom it may concern:*

Be it known that we, ELMER B. MILLER and PETER C. SAYGER, citizens of the United States, residing at Grand Rapids, Michigan, have invented certain new and useful Improvements in Sash-Cord Guides, of which the following is a specification.

Our invention relates to sash-cord guides, and it includes features pertaining to the rivet connecting the sides of the shell forming the axle of the pulley and the manner of securing it to the shell. It further includes features relating to a roller-bearing for the pulley.

The invention consists in the features and combination and arrangement of parts hereinafter described, and particularly pointed out in the claims.

Figure 5:
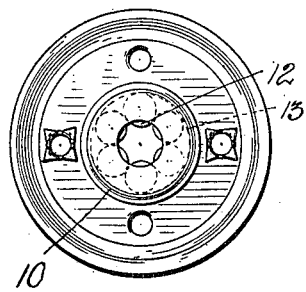
Figure 6:
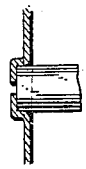
Figure 7:
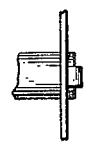
Figure 4:
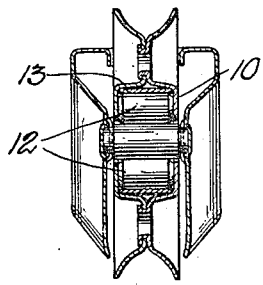

In the accompanying drawings, Figure 1 is a side view of the shell with the pulley in place. Fig. 2 is a sectional view of the shell on the line 2 2 of Fig. 1, parts being shown in elevation. Fig. 3 represents a sectional view on the line 3 3 of Fig. 1 with some of the parts shown in elevation. Fig. 3$^a$ is a view on line 3$^a$ 3$^a$ of Fig. 1. Fig. 4 is a view similar to Fig. 3 with the pulley in section to show the construction of the pulley and the roller-bearing therefor. Fig. 5 is a side view of the pulley alone. Fig. 6 is a sectional detail view of a modification. Fig. 7 is a plan view of the same.

In the drawings, the pulley 1 is of known form, generally speaking, its specific points of novelty being hereinafter noted. It turns about an axle 2, which is supported in a shell or casing 3, adapted to be secured to the window-frame in any suitable manner. This axle or rivet serves to hold together the two opposite sides of the shell and to hold the said sides firmly and accurately at a determined distance apart and in a certain relation to the pulley. Heretofore it has been the practice to form this rivet or pin with a reduced portion at each end of angular cross-section to pass through openings in the opposite sides of the shell, the said shell fitting with its inner faces against the shoulders at the ends of the rivet provided by reducing the ends of the pin or rivet, and the ends of the reduced portions projecting through the shell were headed or riveted down, thus securing the sides of the shell and the rivet together. We aim to avoid the use of a specially-shouldered rivet and a rivet having the reduced extensions rectangular in cross-section and to use instead a plain piece of wire or rod of ordinary cylindrical cross-sectional shape throughout and of the proper length to reach from side to side of the shell and to project slightly beyond the outer face of the shell on both sides of the same. Such a plain rivet is shown at 2 in Figs. 2 and 3 of the drawings. The shell at the points where the rivet passes through is preferably slightly countersunk, as at 4, and the openings for the rivet are formed in these countersunk portions. Across these openings and countersunk portions of the shell bridge-pieces or straps 6 of the metal extend, the inner faces of the said straps being at a slight distance above the bottom of the countersunk portions of the shell. The end faces of the plain rivet bear against the inner sides of these bridge-pieces, which thus act as stops to prevent inward movement of either side of the shell along the rivet and in this way serve as limiting means. It will be noticed that these stops or bridge-pieces are formed by cutting them from the metal of the shell, being intact with said shell at their ends. They are narrower than the diameter of the end faces of the rivet and extend across the center of the said end faces, leaving portions thereof exposed at each side of each stop or bridge, and by a suitable instrument these ends of the rivet or connecting-rod are spread laterally, so as to extend like a rivet over the edge of the shell at 7, to thus firmly grip the shell and hold it against displacement outwardly in respect to the rivet or axle. This same spreading action of the end of the rivet makes the said end assume an elliptical form and causes the rivet to fit tightly in the opening in the shell. Further than this, it will be noticed that the limiting strap or bridge is pressed down near its ends 6$^\times$ over the edges of the rivet, and by reason of the end of the rivet being slightly spread and the said bridge gripping the face and edges of the rivet the latter will be held firmly against turning. The spreading of the end of the rivet is preferably done by an edged tool, which when applied to the end face on opposite sides of the bridge and force exerted thereon will cut the said end face and upset the metal to one side, the cuts left by said tool being indicated at 9.

It will be seen from the above that we employ a plain piece of round wire of the same diameter throughout and secure this to the shell by riveting down or spreading its end portions and by having a part of the shell extend over the end face of the rivet to thus act as a stop or shoulder. This construction avoids the time and expense necessarily involved in making rivets with reduced angular extensions having shoulders to afford bearings for the shell.

In order to provide roller-bearings for the pulley, which is shown in Fig. 4 as formed of sheet-metal sections secured together, we provide the sections each with a lateral cup-shaped extension or formation having an annular flange 10 on each section surrounding the central opening for the rivet or axle. The rollers 12 are arranged within the chamber formed by these cup-shaped portions and are confined by their ends finding a bearing against the said flanges, and they roll on a bearing-shell 13 of cylindrical form fitting within the chamber formed by the cups of the sections. This shell is open at its ends and provides a wearing-surface for the rollers extending from side to side of the pulley and bridging the joint between the pulley-sections. The track for the rollers is thus continuous and intact throughout its extent. It will be noticed that the said track or shell is held in place simply by fitting between the cup-shaped portions on the sections. No special means of fastening is required, and the whole bearing is completed simply by uniting the sections of the pulley together. It will be further noticed that the bearing is self-contained in respect to the pulley—that is to say, it forms a part of the pulley structure, is carried thereby permanently, and therefore it, together with the pulley when assembled, as illustrated in Fig. 4, may be handled as one body in associating the same with the shell.

We do not wish to limit ourselves to the precise form of stop to extend over the end of the rod, nor to the particular manner of making a bearing in the shell for the end of the rod, as other forms of stops may be employed and other bearing-surfaces, as indicated in Figs. 6 and 7.

We claim—

1. In combination with the shell, a piece of wire or rod, plain from end to end, riveted or headed into connection with the outer sides of the shell and means independent of the rod forming a stop for the said wire or rod to prevent the same from passing out through the side of the shell.

2. In combination with a pulley and its shell, an axle connecting the sides of the shell, consisting of a piece of wire or rod of plain cylindrical form from end to end, passing through openings in the shell and riveted or headed against the outer sides of the shell, said shell having a portion engaging the end face of the wire or rod, substantially as described.

3. In combination with a pulley and its shell, an axle connecting the sides of the shell, by being headed against the outer side of the said shell, said axle consisting of a rod or wire piece passing through openings in the shell, said shell having a portion thereon engaging the projecting end of the rod at a point out beyond the opening in the shell.

4. In combination with a pulley and its shell, an axle connecting the sides of the shell by being headed or riveted against the same, said axle consisting of a rod or wire piece passing through openings in the shell, said shell having an integral bridge portion extending from side to side over the end face of the said rod, substantially as described.

5. In combination with the sheet-metal shell, a rivet connecting the sides of the shell having its ends passing through openings in the shell and headed or riveted in connection therewith, said sheet-metal shell having a portion struck out therefrom to engage a part of the rivet to hold the same against movement across the shell, said rivet serving as the axle for the pulley, substantially as described.

6. In combination with a pulley and its shell, an axle connecting the sides of the shell, consisting of a rod, said shell having a portion extending over and partially covering the end face of the said rod, the exposed part of the end of the rod being headed or riveted into connection with the shell, substantially as described.

7. In combination with the pulley, the shell having the openings with stops overlying the openings, an axle connecting the sides of the shell consisting of a rod extending through the openings and arranged to bear on the stops, said stops being pressed into gripping contact with the edge of the rod, substantially as described.

8. In combination with a pulley-shell having countersunk portions therein, a connecting-rod having its ends passing through openings in the said countersunk portions, said shell having a portion overlying the projecting end face of the connecting-rod, substantially as described.

9. In combination, the pulley, the shell having the countersunk portions with openings therein, straps extending from side to side of the countersinks and overlying the said openings and an axle connecting the sides of the shell and consisting of a rod extending from side to side of the shell and bearing against the said straps, substantially as described.

10. In combination, with a pulley, the shell, an axle connecting the sides of the shell and consisting of a rod extending between the sides of the shell riveted thereto and bearing therein, a portion of each side of said shell extending across the ends of the rod leaving portions of the ends of said rod exposed, substantially as described.

In testimony whereof we affix our signatures in presence of two witnesses.

ELMER B. MILLER.
PETER C. SAYGER.

Witnesses:
    JAMES DUFFY,
    F. L. PERKINS.